United States Patent

Jones et al.

[11] 4,066,044
[45] Jan. 3, 1978

[54] ROTARY ENGINE WITH TONGUE AND GROOVE INSERTS IN ROTOR FACES

[75] Inventors: Charles Jones, Hillsdale; Robert William Loyd, Jr., Wyckoff, both of N.J.

[73] Assignee: Curtiss-Wright Corporation, Wood-Ridge, N.J.

[21] Appl. No.: 721,675

[22] Filed: Sept. 9, 1976

[51] Int. Cl.² .............................................. F04B 55/02
[52] U.S. Cl. .................................... 123/8.09; 418/179
[58] Field of Search ...................... 418/61 A, 178, 179; 123/8.01, 8.09, 8.11, 8.13

[56] References Cited

U.S. PATENT DOCUMENTS

| 3,558,246 | 1/1971 | Philipp | 418/179 X |
| 3,995,602 | 12/1976 | Burley | 418/178 X |

FOREIGN PATENT DOCUMENTS

| 1,817,099 | 9/1970 | Germany | 123/8.09 |
| 964,131 | 7/1964 | United Kingdom | 123/8.11 |

Primary Examiner—William L. Freeh
Assistant Examiner—Leonard Smith
Attorney, Agent, or Firm—Victor D. Behn; Arthur Frederick

[57] ABSTRACT

A rotary combustion engine in which at least a portion of each of the rotor working surfaces is covered by an insert to raise the operating temperatures of said surfaces, the insert being secured to the rotor by a tongue and groove fit.

6 Claims, 6 Drawing Figures

ROTARY ENGINE WITH TONGUE AND GROOVE INSERTS IN ROTOR FACES

BACKGROUND OF THE INVENTION

The invention relates to rotary combustion engines of the type disclosed in U.S. Pat. No. 2,988,065 granted June 13, 1961 to Wankel et al, and particularly, to such an engine designed for operation as a stratified charge engine, for example, as disclosed in U.S. Pat. No. 3,246,636 granted Apr. 19, 1966 to Bentele and U.S. Pat. No. 3,894,518 granted July 15, 1975 to Gavrun et al.

In such stratified charge engines the fuel discharged by high pressure fuel nozzles strikes the working surfaces of the engine rotor. If the rotor working surfaces are too cool, this results in the formation of heavy carbon deposits on the rotor surfaces as well as the generation of significant smoke in the engine exhaust and increases the hydrocarbons in the engine exhaust. This is particularly true where the interior of the rotor is cooled by a cooling medium such as oil, for example, as disclosed in U.S. Pat. No. 3,176,915 granted Apr. 6, 1965 to Bentele et al.

U.S. Pat. No. 3,359,956 granted Dec. 26, 1967 to Bentele discloses a stratified charge rotary engine in which the rotor working surfaces are provided with a coating of low thermal conductivity so as to increase the temperature of the rotor working surfaces. This serves to decrease the aforementioned carbon deposit buildup on the rotor as well as the smoke and hydrocarbons in the engine exhaust. U.S. Pat. No. 3,359,956 to Bentele, however, has the disadvantage in that the rotor coating tends to chip or flake off, particularly if relatively thick coatings are applied to the rotor to provide a coating of significant insulating properties over the rotor. This flaking is probably the result of thermal shock caused by temperature differences between the inner and outer surfaces of the coating during engine operation.

SUMMARY OF THE INVENTION

Accordingly, an object of this invention is to provide a rotor for a rotary combustion engine with a novel rotor configuration so as to raise the operating temperatures of its working surfaces without the aforementioned disadvantages of Bentele U.S. Pat. No. 3,359,956.

Co-pending application Ser. No. 721,674 filed concurrently herewith in the name of Charles Jones and entitled "Rotary Engine with Inserts in Rotor Faces" discloses the general concept and a number of specific configurations for providing an insert for each working face of the rotor to provide an air-insulating air space between the major portion of the insert and the body of the rotor in order that the working surfaces of the rotor run substantially hotter than they would in the absence of the insert and insulating air space thereby helping to vaporize the fuel and insure more complete combustion. In accordance with the present invention, a relatively simple and novel means is provided for securing each insert to the rotor. Specifically, the present invention provides a tongue and groove fit between each insert and the rotor so that each insert may simply be slid into position along the tongue and groove fit. The tongue and groove fit between each insert and the rotor is disposed generally at right angles to radial direction to support the insert against centrifugal forces thereon. At the same time the tongue and groove support for each insert minimizes any stress concentrations resulting from attachment of each insert to the rotor. Means are also provided to lock the insert in its desired position on the rotor along its tongue and groove fit and at the same time permit thermal expansion and contraction of each insert relative to the rotor. Also each insert preferably terminates short of the rotor apex portions in order that these portions and their apex seals do not operate at the high temperatures of the inserts.

For ease of fabrication, the tongue and groove fit for each insert consists of straight tongues and grooves disposed generally at right angles to the rotor radius at the mid-portion of the associated working face of the rotor. The invention, however, is not limited to a straight tongue and groove fit. Thus, in another embodiment of the invention, the tongue and groove fit extends over an arc of a circle. This has the advantage of making it possible to provide a deeper recess in each insert and still have the insert terminate short of the apex portions of the rotor.

Other objects of the invention will become apparent upon reading the following detailed description in connection with the drawings.

DESCRIPTION OF PREFERRED EMBODIMENTS

Figure 2:
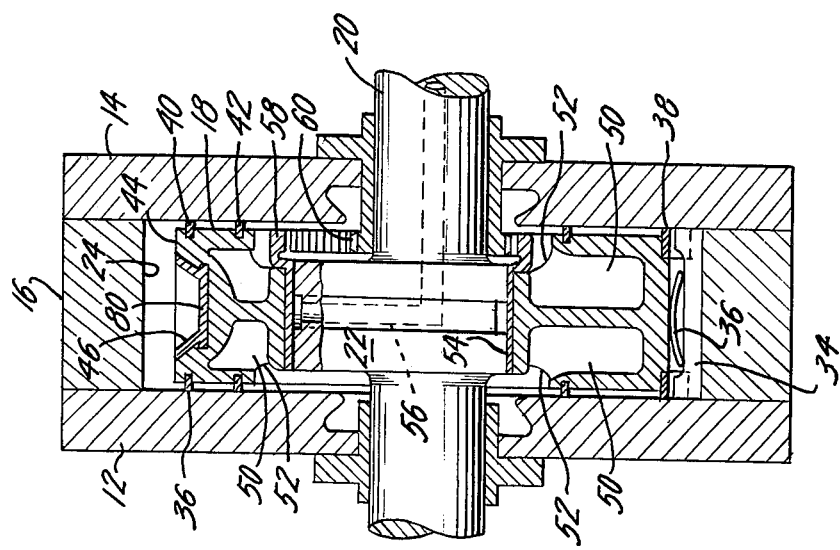
FIG. 2 is a sectional view taken along line 2—2 of FIG. 1.
Figure 1:
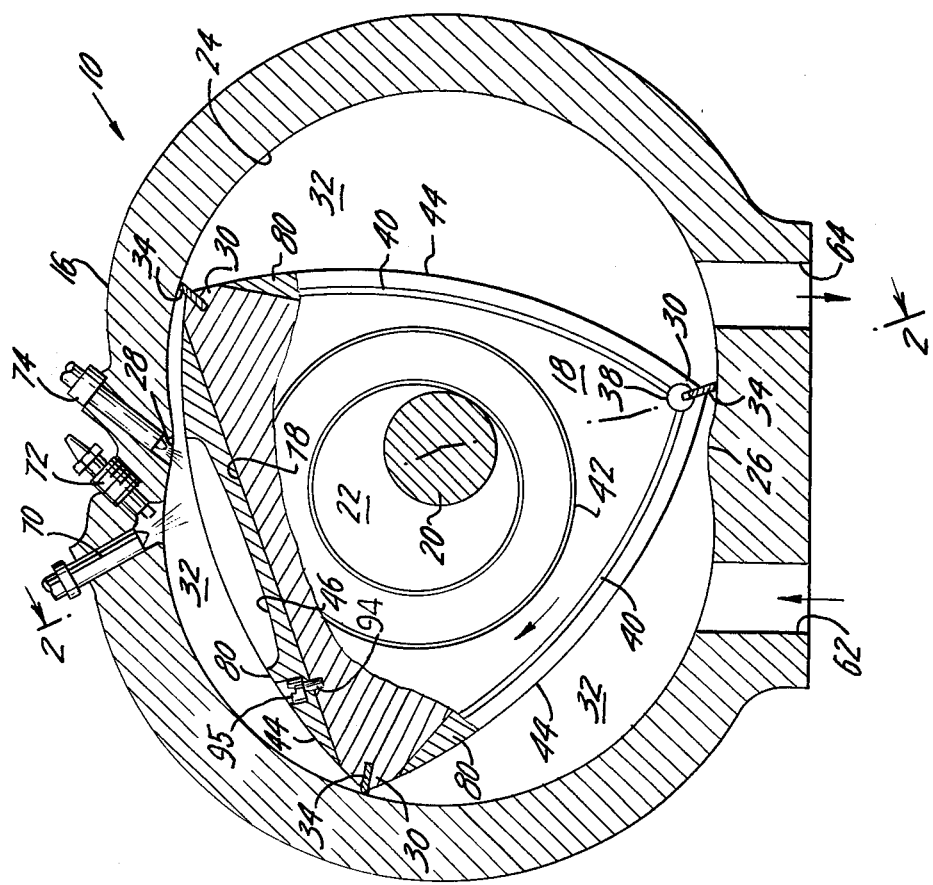
FIG. 1 is a transverse sectional view through a rotor engine embodying the invention.
Figure 3:
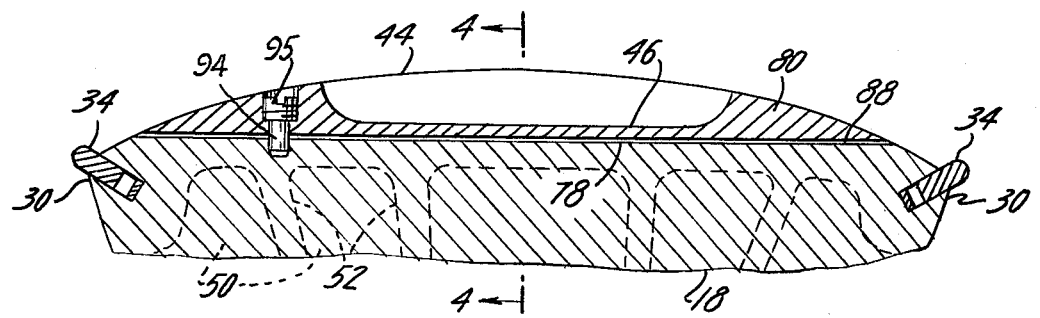
FIG. 3 is an enlarged view of a portion of FIG. 1.
Figure 4:
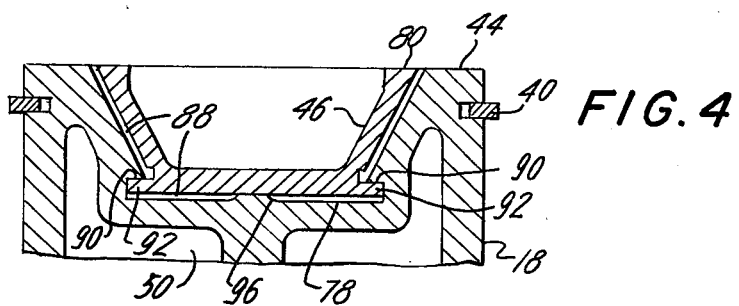
FIG. 4 is a further enlarged sectional view taken along line 4—4 of FIG. 3.

Referring to the drawing, particularly to FIGS. 1 and 2, a rotary combustion engine is schematically indicated at 10, the engine being generally similar to that described in the aforementioned patents. The engine 10 comprises an outer body or housing consisting of two axially-spaced end housings 12 and 14 and an intermediate or rotor housing 16, these housing parts being secured together to form the engine internal cavity therebetween. An inner body or rotor 18 is journaled for rotation within the housing cavity on an eccentric portion 20 of a shaft 22 which extends coaxially through and is supported by the end housings 12 and 14.

The peripheral inner surface 24 of the intermediate housing 16 is illustrated as having a two-lobe profile which preferably is basically an epitrochoid, said two lobes joining at junctions or regions 26 and 28 disposed relatively near to the engine axis. The rotor 18 has a generally triangular profile with apex portions 30 having sealing cooperation with the trochoid surface 24 to form three working chambers 32 between the rotor and the housing parts 12, 14 and 16. For this purpose, each of the rotor apex portions is provided with a seal 34 which extends across the rotor between the inner walls of the end housings 12 and 14. A spring 36 is provided under each apex seal 34 for urging the seal into sealing contact with the trochoid surface 24. Also, a seal pin 38 is provided at each end of an apex seal strip for sealing engagement with the adjacent housing end wall 12 or 14.

The rotor also has suitable seal strips 40 on its end faces adjacent to the rotor periphery and extending between adjacent apex portions 30 of the rotor for sealing contact with the inner walls of the end housings 12 and 14. Each end face of the rotor 18 also has a suitable annular oil seal 42. Springs (not shown) are provided for urging the seals 40 and 42 into contact with the housing end walls 12 and 14. Each of the three peripheral or working surfaces or faces 44 of the rotor extend between adjacent apex portions 30 of the rotor and preferably have a trough-like recess 46.

The interior of the rotor 18 preferably is divided into circumferentially-spaced compartments 50 by partitions 52 to facilitate cooling of the rotor by circulation of oil or other cooling medium through these compartments, for example, as described in U.S. Pat. No. 3,176,915 granted on Apr. 6, 1965 to Bentele et al. As in the Bentele et al patent, the oil supplied to the rotor bearing 54 from the shaft passage 56 flows out the ends of this bearing 54 from which the oil is thrown radially outwardly into the rotor compartments 50 by the centrifugal forces on the oil to cool the rotor, or oil jets (not shown) are provided for supplying cooling oil to the rotor compartments 50. This oil cooling of the rotor is provided to minimize thermal distortion of the rotor and to protect the rotor bearing 54 and rotor seals from excessive heat.

The engine 10 also includes gears 58 and 60 secured to the rotor 18 and to the engine housing, respectively, to control relative rotation of the rotor. In addition, the engine housing includes an air intake passage 62 disposed adjacent to and on one side of the near-axis region 26 of the trochoid surface 24 and an exhaust passage 64 disposed on the other side of said near-axis region. Combustion is initiated in the engine working chambers 32 adjacent to the other near-axis region 28 of the trochoid surface.

During engine operation and with the rotor rotating clockwise as viewed in FIG. 1, the volume of each working chamber 32 periodically increases from a minimum volume condition, when it is located adjacent to the near-axis region 26 and opens to the intake port 62, to a maximum volume condition and closes to the intake port and then said chamber decreases in volume to compress its intake charge until the chamber again reaches a minimum volume condition, but this time adjacent to the near-axis region 28 at which combustion takes place. Thereafter, the volume of said chamber again increases to a maximum as the combustion gases expand and then decreases to a minimum as the chamber comes into communication with the exhaust port 64 adjacent to the near-axis region 26 to complete its four-stroke cycle. The three working chambers 32 sequentially go through the same cycle.

A fuel nozzle 70 is mounted on the intermediate housing 16 adjacent to the near-axis region 28. The fuel nozzle 70 has its fuel discharge end disposed in a recess opening to the trochoidal surface 24 for discharging fuel into each working chamber 32 after the air intake charge within the chamber has been substantially compressed and combustion is about to be initiated. The fuel nozzle 70 directs at least the major portion of its fuel into the combustion recess or trough 46 of each working chamber 32. A spark plug type igniter 72 is also mounted on the intermediate housing 16 adjacent to the near-axis region 28. The electrodes of the spark plug 72 are disposed adjacent to the discharge end of the nozzle 70 preferably so that the nozzle discharge end and the spark plug electrodes both open through the trochoidal surface 24 through a common recess. In addition, the fuel nozzle 70 and spark plug 72 preferably are disposed so that at least a portion of the fuel vapor produced by the fuel spray discharged by the nozzle passes in close proximity to the spark plug electrodes immediately as the fuel leaves the nozzle 70 for ready ignition by said spark plug.

The engine structure so far described is conventional and is generally similar to that disclosed in the aforementioned patents to Bentele, Bentele et al, and Gavrun et al. In addition, as disclosed in the aforementioned patent to Gavrun et al, a second fuel nozzle 74 preferably is also mounted on the intermediate housing 16 also adjacent to the near-axis region 28 so that this second fuel nozzle is adjacent to the fuel nozzle 70 and spark plug 72. Like the fuel nozzle 70, the second fuel nozzle 74 also directs at least the major portion of its fuel into the combustion recess 46 of each working chamber 32. As described in the Gavrun et al patent, the flame produced by the burning fuel discharged from the nozzle 70 functions as a pilot flame for igniting the fuel as it discharges from the nozzle 74.

With the structure so far described, particularly because the rotor is oil-cooled, the surface of each combustion recess tends to run cool. For this reason, when fuel is discharged from the fuel nozzle 70 or from the nozzles 70 and 74 into the combustion recess 46 of each working chamber, the fuel does not vaporize readily and instead tends to wet this surface, thereby causing coking on this surface and incomplete combustion of the fuel.

In accordance with the invention, each working face 44 of the rotor 18 is recessed by a straight through cut 78, preferably as illustrated, disposed at right angles to the rotor radius to the mid-portion of said rotor face, for the purpose of receiving an insert member 80 which forms the major portion of the working face 44 of the rotor 18. Each insert member 80 has the combustion recess or trough 46 formed therein. Each insert member extends over the major portion of its working face 44 and is secured to the rotor in such a manner as to leave a small clearance 88 between the underside of the insert member and the rotor and to permit relative thermal expansion and contraction of the insert member 80 relative to the rotor. For this latter purpose, each rotor recess 78 has a straight groove 90 which is undercut along each side of the recess 78 and preferably is disposed adjacent to the bottom of the recess. Each insert member 80 has a linear flange or tongue 92 on each side of the insert member and extending longitudinally from one end to the other of said insert member and adapted to be received within the grooves 90 so that the insert member can be slid into position to provide a tongue and groove fit between each insert member 80 and the rotor. The straight tongues 92 and grooves 90 preferably, as illustrated, are disposed at right angles to the rotor radius at the mid-portion of the associated rotor working face. A dowel pin 94 is inserted into aligned holes in the insert member 80 and the rotor after the insert member has been slid into its desired position on the rotor along its tongue and groove fit (90, 92) to lock the insert member in this position. A screw 95 may be provided to keep the dowel pin 94 in position. The ends of each insert member 80 terminate short of the adjacent rotor apex portions 30 and apex seals 34 in order that these apex portions and seals can be adequately cooled by the cooling medium in the rotor compartments 50.

With this construction of FIGS. 1-4, the tongue and groove fit (90, 92) between each insert member 80 and the rotor prevents radial movement of the insert member relative to the rotor. At the same time the dowel 94 at one end of the insert member prevents longitudinal movement of its associated insert member 80 relative to the rotor while the other end of the insert member 80 can expand and contract relative to the rotor. Obviously, the dowels 94 could be located anywhere along their insert members instead of at one end.

The straight cut across the rotor 18 to form each recess 78 with its groove 92 for sliding reception of an insert member 80 substantially facilitates fabrication or machining of these rotor recesses. A straight rib 96 preferably runs along the bottom of each recess 78 to keep the associated insert member 80 spaced by the gap 88 from the bottom of the rotor recess 78. Also the insert member flanges 92 serve to keep the insert member centered in the rotor recess 78 relative to the rotor sides so that a clearance or gap 88 not only is provided between the bottom of each insert member and the rotor as well as between each of the two sides of said insert member and the rotor. However, a small clearance (not shown and less than that of 88) is provided between each flange or tongue 92 and the bottom of its groove 90 in order to permit relative thermal expansion and contraction of each insert member in a direction parallel to the rotor axis.

The gap 88 serves to thermally insulate each insert member 80 from the body of the rotor. Therefore, during engine operation, the insert member 80 runs at a substantially higher temperature than that of the rotor 18. This is particularly true where the interior of the rotor is cooled by oil circulation through the rotor compartments, as previously described. As a result of the high temperature of each insert member 80, the fuel discharged by the fuel nozzle or nozzles into the recess 46 of said insert member is more readily vaporized thereby improving the combustion efficiency and minimizing any coking of carbon on the surface of the rotor.

The required magnitude of this clearance 88 has been exaggerated in the drawing. The clearance 88 can be quite small and yet be effective to adequately heat insulate each insert member 80 from the body of the rotor. For example, in an engine in which each rotor apex has a radius of about 5 inches, a clearance 88 of about 0.025 inch has been found to be effective. The insert members 88 preferably are made of a material such as steel or titanium having a high strength at elevated temperatures and yet being light in weight and, in addition, having a relatively low heat conductivity and preferably also having low thermal expansion.

As illustrated, each insert member 80 terminates short of the adjacent apex portions 30 of the rotor in order that these apex portions and their seals 34 do not operate at excessive temperatures. This is important because if each apex portion 30 of the rotor operated at the high temperatures of the insert members 80, these high temperatures would inhibit adequate lubrication of and low sliding friction between each apex seal 34 and the rotor as well as between each apex seal 34 and the multi-lobe surface 24 of the rotor housing. In this connection, it is noted that each of the rotor apex portions has a chamber 50 directly under the apex portion for circulation of cooling oil through said chamber to keep the temperature of each apex portion 30 of the rotor substantially below that of the insert members 80 during engine operation.

Figure 5:
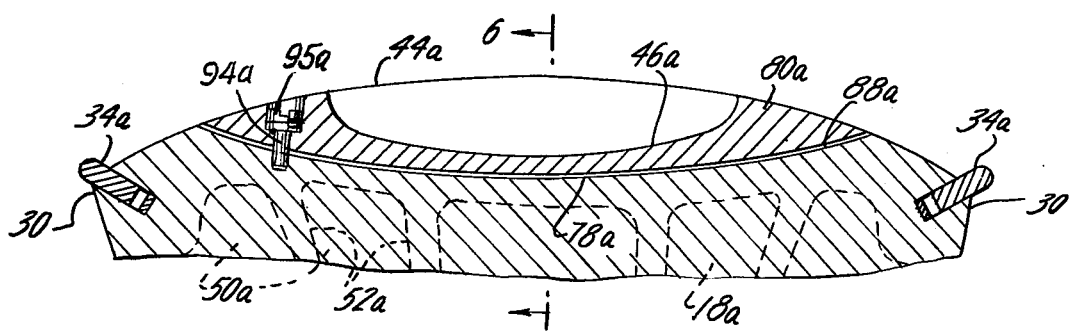
FIG. 5 is a view similar to FIG. 3 but showing a modified form of the invention.
Figure 6:
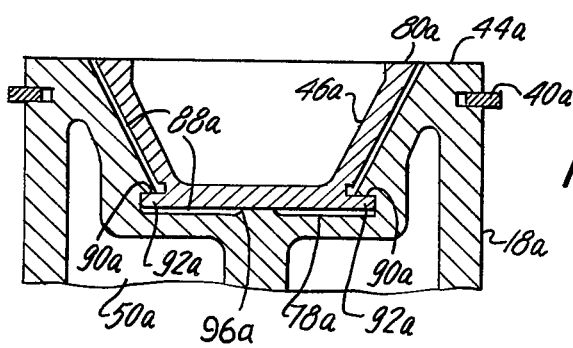
FIG. 6 is a sectional view similar to FIG. 4 but taken along line 6—6 of FIG. 5.

The straight tongues and grooves 90 and 92 of FIGS. 1-4 facilitates fabrication of the rotor recess 78 and the insert members 80. However, in the embodiment of FIGS. 1-4, the depth of each recess 46 in each insert member 80 is limited by the fact that the rotor recess 78 is formed as a straight through cut and the fact that the ends of the cut 78 are spaced from the rotor apex portions 30. If a deeper recess 46 in each insert member and/or if more spacing between each insert member and the rotor apex portions 30 is desired, this can be achieved by making the bottom of the cut or recess 78 an arc of a circle, as illustrated in FIGS. 5 and 6. For ease of understanding, the parts of FIGS. 5 and 6 have been designated by the same reference numerals but with a subscript $a$ added thereto.

The modification of FIG. 5 is similar to that of FIGS. 1-4 except the bottom of the cut or recess 78$a$ is an arc of a circle instead of being a straight through cut and, therefore, the grooves 90$a$ and tongues 92$a$ are likewise arcs of co-axial circles. Accordingly, each insert member 80$a$ of FIGS. 5 and 6 may be slid into position along their arcuate tongue and groove fit just as the insert members of FIGS. 1-4 may be slid into position along their straight tongue and groove fit. As illustrated, the construction of FIGS. 5 and 6 permits the formation of a deeper recess 46$a$ in each insert member 80$a$ and permits more spacing between the ends of the insert members and the rotor apex portions.

In each of the insert members 80 and 80$a$, its combustion recesses 46 or 46$a$ respectively, is shown as being symmetrically positioned in the mid-portion of the insert member. However, it is within the scope of the invention to utilize a non-symmetrical combustion recess and/or to position the recess closer to one end or the other of its associated rotor working face. Also suitable lightening holes could be provided in each insert member to reduce its weight. The outer ends of such lightening holes could be closed by plugs. In addition, although the invention has been described in connection with a rotary engine in which fuel is injected into each working chamber after its intake air-charge has been substantially compressed, the invention is also applicable to rotary engines having other types of fuel systems, for example, a carburetor for supplying fuel through the engine intake passage. With any fuel system, the higher temperature of the rotor insert members will help vaporize the fuel for more efficient combustion and at the same time the insulating air space between each insert member and the body of the rotor will cause the rotor to operate at lower temperatures and therefore at lower thermal stresses.

It should be understood that the invention is not limited to the specific details of construction and arrangement thereof herein illustrated and that changes and modifications may occur to one skilled in the art without departing from the spirit or scope of the invention.

What is claimed is:

1. A rotor for a rotary combustion engine, said rotor comprising:
   a. a main portion having a generally polygonal profile such that said rotor has a plurality of circumferentially spaced apex portions and a plurality of working surfaces with each working surface of said rotor extending between adjacent apex portions, said rotor main portion having a plurality of internal compartments for the circulation of a cooling medium therethrough with each of the rotor apex portions having one of said compartments disposed adjacent thereto;

b. an insert member for each working surface of said rotor with each insert member being elongate to extend circumferentially substantially from one apex portion to the other of its working surface but terminating short of the apex seals of said apex portions to overlie the major portion of said working surface and having an outwardly facing recess; and c. means including a tongue and groove fit for securing each insert member to the rotor so as to leave a gap between the major portion of the facing surfaces of said insert and rotor, each tongue and groove fit for an insert member running in a generally circumferential direction between associated apex portions of the rotor to permit circumferential thermal expansion and contraction of the periphery of said insert member relative to the rotor.

2. A rotor as claimed in claim 1 in which each said tongue and groove fit has a straight line configuration extending lengthwise of its associated working face of the inner body but terminating short of the apex seals at the ends of its said associated working face to permit each insert member to be slid into position along its said tongue and groove fit.

3. A rotor as claimed in claim 1 in which each said tongue and groove fit has the configuration of a circular arc with the ends of each such arc terminating short of the apex seals at the ends of its associated working face of the inner body to permit each insert member to be slid into position along its said tongue and groove fit.

4. A rotary combustion engine comprising:

a. an outer body having an internal cavity, the peripheral surface of which has a multi-lobe profile with said outer body also having an air intake passage and a combustion gas exhaust passage;

b. an inner body of generally polygonal profile mounted for relative rotation within said outer body;

c. seal means carried by each apex portion of the inner body for sealing cooperation with said multi-lobe peripheral surface of the outer body to define a plurality of working chambers which vary in volume in response to said relative rotation and each having a working face on the inner body which extends between adjacent apex portions of said inner body with each said working face having a recess between its ends;

d. a fuel nozzle mounted on the outer body for discharging fuel into each working chamber after the air charge therein has been substantially compressed with at least the major portion of the fuel being directed into the recess of the associated working face of the inner body;

e. a plurality of insert members, one for each of the working faces of said inner body, with each insert member being elongate to extend circumferentially substantially from one apex portion to the other of its working face but terminating short of the apex seals of said apex portions to overlie the major portion of its working face and having a depression to form said recess in its working face;

f. means including a tongue and groove fit for securing each insert member to the inner body so as to leave a gap between the major portion of the facing surfaces of said insert member and inner body, each tongue and groove fit for an insert member running in a generally circumferential direction between associated apex portions of the inner body to permit relative circumferential thermal expansion and contraction of said insert member and inner body.

5. A rotary combustion engine as claimed in claim 4 in which each said tongue and groove fit has a straight line configuration extending lengthwise of its associated working face of the inner body but terminating short of the apex seals at the ends of its said associated working face to permit each insert member to be slid into position along its said tongue and groove fit.

6. A rotary combustion engine as claimed in claim 4 in which said tongue and groove fit has the configuration of a circular arc with the ends of each such arc terminating short of the apex seals at the ends of its associated working face of the inner body to permit each insert member to be slid into position along its said tongue and groove fit.

* * * * *